INVENTOR
LEWIS A. MEDLAR

April 19, 1966  L. A. MEDLAR  3,247,442
BATTERY CHARGERS
Filed Dec. 4, 1961  3 Sheets-Sheet 2

INVENTOR
LEWIS A. MEDLAR
BY D. C. Roylance
ATTORNEY 3,247,442
BATTERY CHARGERS
Lewis A. Medlar, Lansdale, Pa., assignor to Fox Products Company, Philadelphia, Pa., a corporation of Pennsylvania
Filed Dec. 4, 1961, Ser. No. 159,477
5 Claims. (Cl. 320—39)

This invention relates to battery charges and more particularly to battery charges in which a relatively high charging current is supplied to the battery until the terminal voltage of the battery reaches a desired definite value, at which time the charging current is altered automatically. This application includes subject matter originally disclosed and claimed in my copending application Serial Number 820,031, filed June 12, 1959.

A general object of the invention is to devise an improved battery charger capable of automatically changing the level of charging current in response to variations in the terminal voltage of the battery being charged.

Another object is to provide a novel battery charging circuit automatically operative to maintain a desired substantially constant predetermined charging current.

A further object is to devise an improved voltage cutoff circuit for battery chargers which is bistable in operation and which will lockout after cutoff.

Yet another object is to provide, in a battery charging circuit employing a saturable reactor including control means energized by a circuit responsive to the terminal voltage of the battery, novel means for effectively eliminating harmonics which tend to be induced in the control means.

A still further object is to devise a transistorized control circuit of the type described wherein the transistors are subjected to only small voltages regardless of the voltage rating of the battery being charged.

In order that the manner in which these and other objects are attained in accordance with the invention can be understood in detail, reference is had to the accompanying drawings, forming a part of this specification, and wherein.

Figure 1:
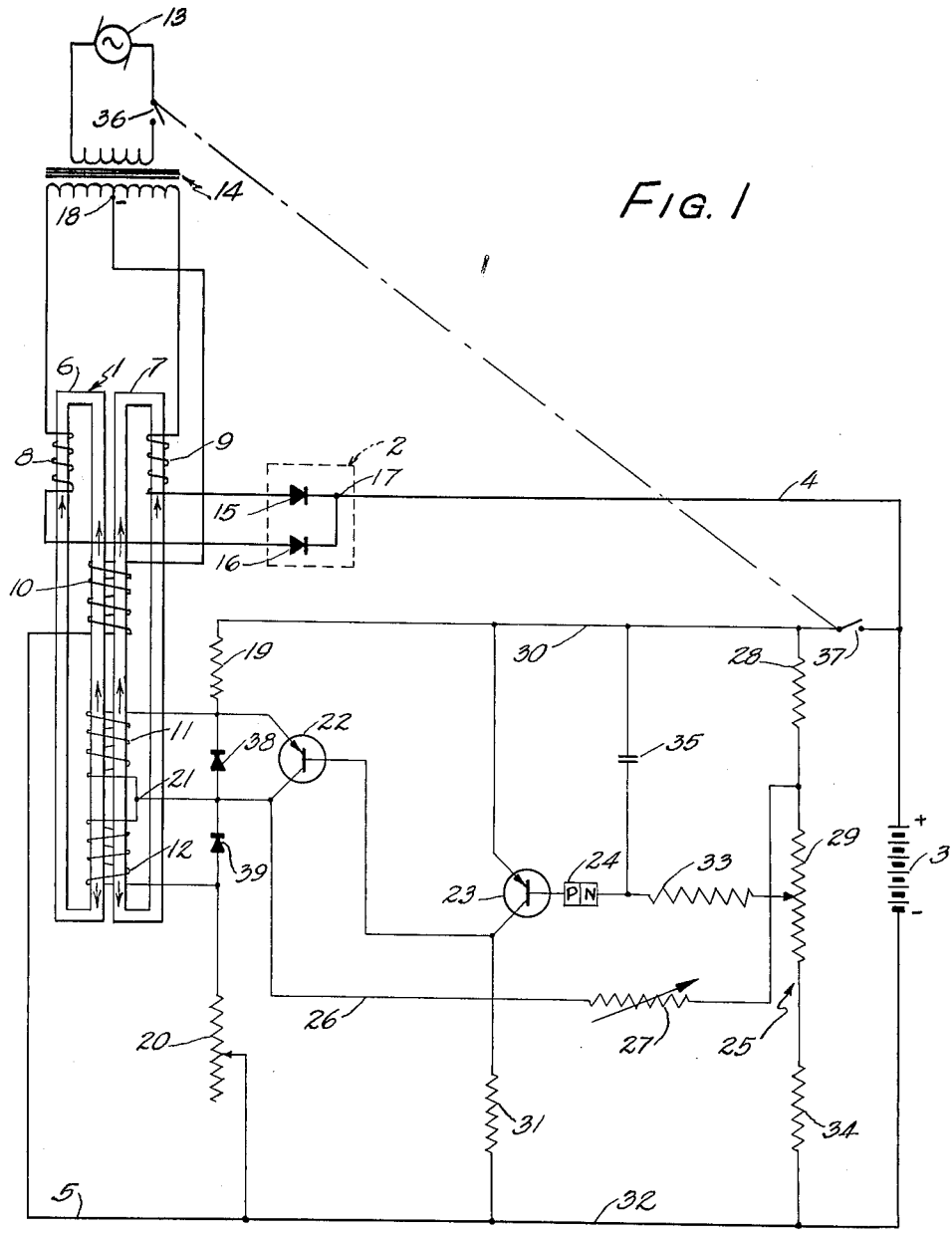
FIG. 1 is a circuit diagram illustrating a novel constant current, automatic voltage cutoff battery charger constructed in accordance with one embodiment of the invention.

Referring now to the drawings in detail, and first to FIG. 1 thereof, it will be seen that this embodiment of fier the invention employs a saturable reactor 1 and a rectifier 2, arranged to control the charging current delivered to battery 3 via conductors 4 and 5. Saturable reactor 1 comprises two closed, saturable cores 6, 7 of magnetic material, the outer leg of each core carrying an impedance or gate winding as indicated at 8 and 9, respectively. A feedback coil 10 is wound on both inner legs of the cores, as are also two control windings 11 and 12. Control windings 11, 12 are series connected, oppositely wound and, in this embodiment, have substantially the same number of turns.

Supply current is derived from any suitable A.C. source 13 via transformer 14, one terminal of the secondary winding of the transformer being connected to a terminal of winding 8 and the other secondary winding terminal being connected to a terminal of winding 9. The other terminals of windings 8 and 9 are connected via rectifying elements 15 and 16, respectively, to the positive terminal 17 of rectifier 2. Conductor 4 leads directly from positive terminal 17 of the rectifier to the positive terminal of battery 3, while conductor 5 is connected between the negative terminal of battery 3 and center tap 18 of the secondary winding of transformer 14. Feedback coil 10 is connected in series with conductor 5.

As indicated by the arrows, and giving attention to the action of rectifier 2, the magnetomotive forces resulting from the current flowing in windings 8 or 9 oppose the magnetomotive forces resulting from current flow in windings 10 and 11 but aid the magnetomotive forces resulting from current flow in coil 12.

Constancy of charging current is attained as a result of operation if the saturable reactor in a servo system fashion, the magnetomotive force generated by negative feedback coil 10, viewed as the "output," being compared with the net magnetomotive force generated by control coils 11, 12, the overall net magnetomotive force determining the degree of saturation of the reactor and hence determining the output current supplied to the rectifier.

Control coils 11, 12 are connected across the rectifier output, and thus across battery 3, in series opposition. One terminal of winding 11 is conected to conductor 4 via a small resistance 19, while one terminal of winding 12 is connected to conductor 5 via a rheostat 20. The other terminals of the two control coils are connected together, as at 21. Considering only those circuit portions just mentioned, it is obvious that the battery voltage would cause current to flow through the two control windings in series, providing a definite net control magnetomotive force, since the series combination of the control windings, resistance 19 and rheostat 20 is connected across the battery.

Connected in shunt relation with control winding 11 is a transistor 22, forming part of a control circuit including as its main elements a second transistor 23, a Zener diode 24 and a voltage divider indicated generally at 25. Transistors 22, 23 are both of the P-N-P type and each includes an emitter, a collector and a base. As will be seen, the transistors 22, 23 are employed as switching devices to selectively shunt certain of the circuit elements. The emitter of transistor 22 is connected to a point between coil 11 and resistance 19, while the collector is connected to junction point 21 between the two control coils, and also, via conductor 26 and adjustable resistance 27, to the junction point between a resistance 28 and the potentiometer 29 of the voltage divider 25.

The emitter of transistor 23 is connected to conductor 30 at a point between resistance 19 and the positive terminal of the battery, while the collector of that transistor is connected, via resistance 31, to conductor 5 at a point between rheostat 20 and the negative terminal of the battery. The base of transistor 22 is connected directly to the collector of transistor 23. The base of transistor 23 is connected, via Zener diode 24 and a resistance 33, to the adjustable contact of potentiometer 29 of the voltage divider.

The voltage divider is completed by a resistance 34 connected between potentiometer 29 and conductor 5. Resistances 28, 34 and potentiometer 29 can be of any values required for derivation from battery 3 of the proper operating voltage of the Zener diode. A fixed condenser 35 is connected between conductor 30 and the juncture between diode 24 and resistance 33. Manual switch 36 is provided in series with the primary winding of transformer 14, and a like switch 37 is provided in conductor 30 adjacent the battery, the two switches being gauged so that both are opened and closed together.

Zener diode 24 is so poled as to receive current from the battery only in the inverse (high resistance) direction.

So long as the terminal voltage of the battery is below a predetermined value (to which the control circuit is to respond to reduce the charging current) the voltage applied to the Zener diode is inadequate to cause the diode to conduct. However, when the battery voltage reaches the predetermined value, the voltage applied to the Zener diode is adequate to cause the same to conduct in its inverse direction. Once the diode is made conductive in this fashion, the voltage drop thereacross remains substantially constant, regardless of variation of the current through the diode.

Assuming that switches 36 and 37 are closed and that the battery voltage is below the predetermined value to which the control circuit is to respond, transistor 23 is fully nonconductive and transistor 22 is fully conductive. Since transistor 22 shunts control coil 11, the full control current flows through coil 12. Hence, the net magnetomotive force from the control coils is at a maximum, and the charger supplies its maximum output to the battery, the charging current remaining substantially constant regardless of line voltage variations, due to the magnetic servo action hereinbefore described.

When transistor 22 is fully conductive, current flows through the positive feedback circuit formed by conductor 26 and resistance 27 to increase the potential at the center tap of resistance 29, i.e., the voltage drop across the lower portion of resistance 29 and resistance 34 is increased and the voltage drop across the upper portion of resistance 29 and resistance 28 is decreased. Zener diode 24 is, in effect, connected across the upper portion of voltage divider 25 by means of the base-to-emitter circuit of transistor 23 and resistance 33. The operation of the feedback circuit is to decrease the operating potential applied across the Zener diode when transistor 22 is conductive, a factor taken into consideration when adjusting resistance 29.

As charging proceeds, and the battery voltage increases, the voltage derived via voltage divider 25 and applied to the Zener diode 24 increases until the battery voltage reaches the critical value. Diode 24 then becomes conductive. At the instant diode 24 becomes conductive, the current therethrough is just sufficient to make transistor 23 somewhat conductive.

The value of resistance 31 is so selected that the potential at the base of transistor 22 is at the edge of saturation for the transistor. Hence, a slight flow of current through transistor 23 causes the emitter-to-base potential of transistor 22 to decrease, resulting in a decrease in conductivity of transistor 22.

Conductor 26 and resistance 27 form a positive feedback circuit such that, as transistor 22 becomes less conductive, less current flows through resistance 27, and a greater operating potential is accordingly applied, via the upper portion of voltage divider 25, to Zener diode 24. The emitter-to-collector current of transistor 23 therefore increases still further, resulting in a further decrease in the potential at the base of transistor 22. Transistor 22 is thus positively caused to become completely non-conductive and is therefore no longer effective to shunt control coil 11. It should be noted that a state of marginal conductivity cannot persist in either transistor 22 or 23. The transistor control circuit is therefore bistable. The circuit has only a stable on state where transistor 22 is fully conductive and transistor 23 is fully nonconductive and a stable off state where transistor 22 is fully nonconductive and transistor 23 is fully conductive.

It will be understood that the voltage at the battery terminals is a pulsating voltage, due to operation of rectifier 2. The control circuit comprising voltage divider 25, diode 24, and transistors 22, 23 is very sensitive, sufficiently so that, when the battery voltage approaches its desired value, a single voltage pulse causes the Zener diode to become conductive and transistor 22 to be made nonconductive. Since the amplitude of the pulsating voltage at the battery terminals varies with line voltage, and because of the sensitivity if the control circuit, there is a tendency for the voltage cutoff to vary with line voltage. It is therefore desirable that the transistor control circuit lockout after cutoff. Such lockout operation is achieved by means of the feedback circuit. When the battery terminal voltage is low, the transistor control circuit is "on" and therefore feedback current flows through resistor 27 to decrease the potential from the battery as applied to Zener diode 24 via voltage divider 25. Subsequently, when the battery terminal voltage increases and causes Zener diode 24 to break down, the transistor control circuit turns off. As the circuit turns off, feedback current ceases to increase the potential applied across the Zener diode. In order for the circuit to again turn on, the battery terminal voltage must decrease to a value considerably below that previously required to turn the circuit off. This mode of operation is referred to as the lockout action of the control circuit.

Condenser 35 is connected to also help reduce the sensitivity of the control circuit to the pulsating voltage by filtering the voltage pulses from the control circuit. Another function of capacitor 35 is to insure that transistor 22 is initially conductive when switch 37 is first closed. Transistor 23 can conduct only when sufficient potential is applied across the base-to-emitter circuit and the Zener diode thus requiring that condenser 35 be charged. While condenser 35 is charging, transistor 23 is nonconductive, rendering transistor 22 conductive to place the feedback circuit in operation. The condenser also eliminates any stray voltage surges and such harmonics, resulting from operation of the saturable reactor, as are not effectively eliminated by rectifiers 38 and 39, described hereinafter.

When transistor 22 is completely nonconductive, current from the battery must flow through both control coils 11 and 12 in series and, since these coils are in opposition, their net magnetomotive force is greatly diminished. The magnetomotive force of feedback coil 10 must follow that of the control coils and therefore also is greatly diminished. Accordingly, the charging current to the battery is reduced.

Rheostat 20 is provided as a means for adjusting the current in control coil 12 when transistor 22 is fully conductive and therefore effective to shunt coil 11. Such adjustment allows the operator to select the value of the rectifier output current.

Use of relatively small resistance 19 assures that the emitter of transistor 22 will be negative with respect to the base when transistor 23 is conductive, thus making certain that transistor 22 will become fully nonconductive at the desired time.

When a saturable reactor absorbs voltage, A.C. voltages are induced in the control coil or coils, the induced voltage being composed of components having the fundamental frequency of the gate or load current and harmonics thereof. The fundamental frequency component is cancelled but the harmonics remain. In the control circuit of the present invention, such harmonics must be dealt with both to protect the transistors and to assure against false actuation of the voltage cutoff means.

For this purpose, a pair of unidirectional conductive devices 38 and 39 are connected each across a different one of the control coils 11, 12, as shown, in such fashion as to block the direct currents passed by the control coils but to pass any harmonic or A.C. which exceeds the IR drop across the coil. Both devices 38 and 39 are advantageously conventional dry plate rectifier elements, connected, both in the same polarity, to be nonconductive to currents flowing in the direction followed by the battery current. Employed in this fashion, the rectifiers 38, 39 are effective to clip harmonics, induced in the control coils, down to the magnitude of the IR drop across the coil, a value already handled by the transistors and therefore not dangerous thereto. Employing rectifiers as described, and recognizing that coils 11, 12 are oppositely wound, full wave clipping of the harmonics, rather than half wave clipping, is accomplished.

The circuit just described is particularly advantageous because it allows the use of transistors having relatively low maximum voltage ratings in a charger adapted to charge batteries with voltages substantially exceeding such ratings. While the coils 11, 12 have equal number of turns, in this embodiment, it is not necessary that the resistance of the two coils be equal. The voltage on transistor 22 is only that across coil 11. In effect, resistance 19, coils 11, 12 and rheostat 20 constitute a voltage divider, allowing the voltage on transistor 22 to be made of any desired value. Transistor 23 is always either fully nonconductive or fully conductive. When transistor 23 is nonconductive, the base current of transistor 22 through resistor 31 absorbs practically all of the voltage in the circuit, so that there remains only a small voltage across transistor 23. When transistor 23 is conductive, being fully so, the voltage thereacross is of course very small. Hence, with the circuit employed in FIG. 1, the voltages applied to the transistors are small regardless of the magnitude of the battery voltage.

Figure 1A:
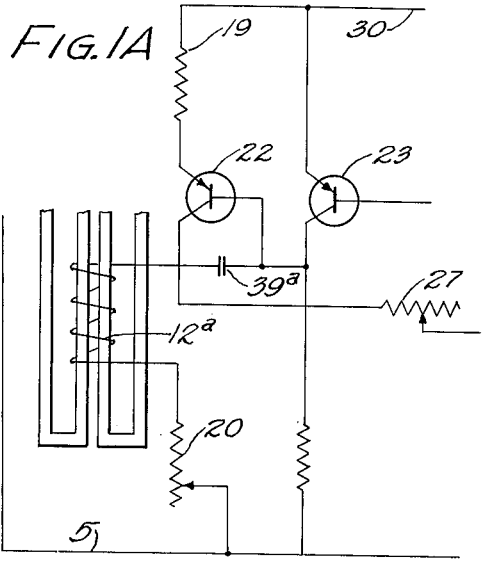
FIG. 1A is a fragmentary schematic diagram illustrating a modification of the device of FIG. 1.

When the predetermined battery voltage to which the cutoff circuit is to respond is less than the maximum voltage which can be safely applied to the transistors, the circuit can be simplified by employing only a single control coil for the saturable reactor, as shown in FIG. 1A. Here, the control coil 12ª is connected in series with the collector of transistor 22, the emitter of the transistor being connected through resistance 19 to conductor 30, as before. Coil 12ª remains connected, through rheostat 20, to conductor 5, as before.

Operation of this modified circuit is broadly the same as explained with reference to FIG. 1. When transistor 22 is conductive, current flows through control coil 12ª, providing control magnetomotive force effective to assure full flow of charging current to the battery. When transistor 22 is nonconductive, substantially no current flows through coil 12ª and there is hence substantially no control magnetomotive force, so that the charging current is at a minimum.

To eliminate harmonics from the control circuit, a capacitor 39a is connected between the base and collector of transistor 22, in the manner fully described and claimed in my copending application Serial Number 820,032, filed concurrently herewith, now U.S. Patent 2,978,633, issued April 4, 1961.

It is a characteristic of transistors that current can flow in the emitter-collector circuit only when a smaller, proportional current flows in the emitter-base circuit. Harmonics generated in control coil 12ª are in the emitter-collector circuit and, without capacitor 39a, the harmonic currents are excluded from the emitter-base circuit. Hence, without the capacitor, the transistor would simply block the harmonic current, the harmonic voltage producing the harmonic current would tend to rise to a level sufficient to cause current to flow, and the transistor accordingly could be damaged.

Capacitor 39a, connected between the base and collector of transistor 22, provides a path by which the harmonic currents in the control coil 12ª can flow in the emitter-base circuit. Thus, as to A.C., there is a complete circuit from the emitter to the base of transistor 22, thence via capacitor 39a to coil 12ª, and thence through battery 3 back to the emitter of transistor 22. The flow of a small "pilot" current in this complete circuit, via capacitor 39a, opens up the emitter-collector circuit to heavier current flow. Such heavier current flow is from emitter to collector, through coil 12ª, through battery 3 and back to the emitter, this circuit being of low enough impedance to allow sufficient current flow to dissipate the harmonic voltages generated in coil 12ª. Because of capacitor 39a, it will be understood that D.C. is excluded from the emitter-base-capacitor circuit, and use of this feature does not disturb the D.C. balance of the control circuit.

Insofar as protection of transistor 22 is concerned, use of capacitor 39a gives the same general advantage as does use of rectifiers 38, 39, described with reference to FIG. 1. However, the capacitor offers additional advantage, not provided by the rectifiers, in substantially completely suppressing the harmonics in such fashion that the harmonics in no way affect the operation of the control circuit. In this connection, will be understood that, should the harmonic currents be allowed to flow in the feedback circuit comprising conductor 26 and resistance 27 and therefore enter the voltage divider, and should the battery voltage then be approaching the predetermined value to which the control circuit is designed to respond, presence of the harmonic current in the voltage divider circuit can cause peaks of voltage to be superimposed on the D.C. voltage from the battery, which peaks can cause the control circuit to operate, to make transistor 22 nonconductive, before the battery voltage reaches the predetermined value. Since the harmonic voltage varies with line voltage, it is obvious that the "cutoff point" of the circuit would now depend undesirably on line voltage. Since capacitor 39a is effective to substantially completely suppress the harmonics, this disadvantage is eliminated.

While, in the embodiment of FIGS. 1 and 1A, the battery charging circuit is designed for constant current operation up to the time of operation of the voltage cutoff circuit, it is to be understood that the novel control circuit of the invention is useful in cases wherein constant current operation is not required. Thus, the circuit of either FIG. 1 or FIG. 1A can be modified to eliminate feedback coil 10, conductor 5 then being connected directly to center tap 18 of the transformer secondary winding.

Figure 2:
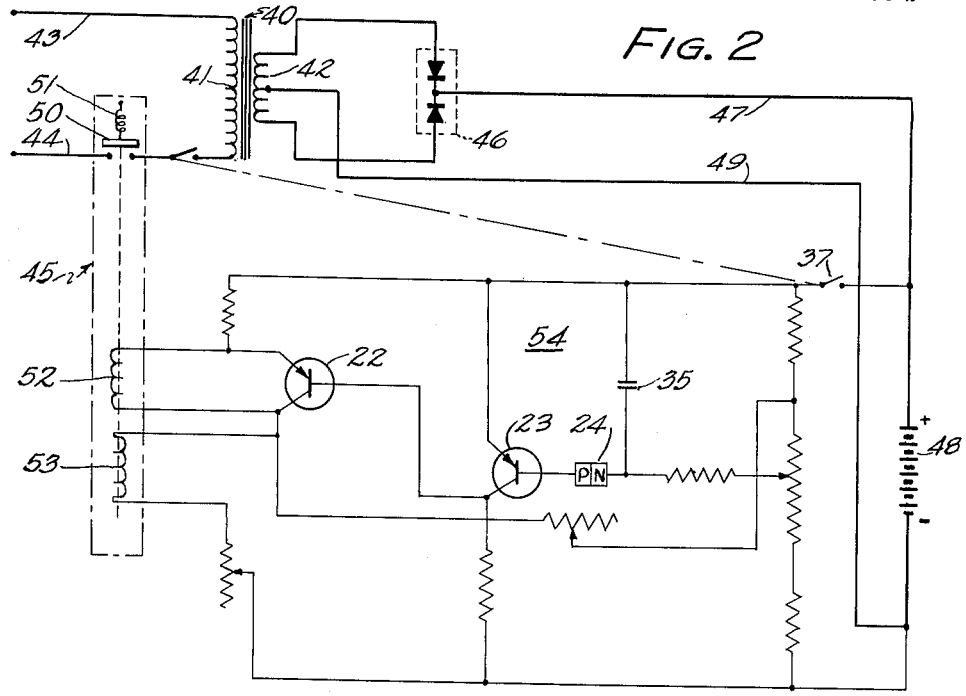
FIG. 2 is a circuit diagram illustrating another embodiment of the invention.

FIG. 2 illustrates another embodiment of the invention, employing the battery voltage responsive control circuit to operate a relay having contacts in the charging circuit. Here, the circuit includes a transformer 40 having a primary winding 41 and a secondary winding 42. Primary winding 41 is connected across any suitable source of alternating current by conductors 43 and 44, the contacts of a control relay 45, described in detail hereinafter, being connected in conductor 44, as shown. The end terminals of secondary winding 42 are connected to a center tap rectifier 46, conductor 47 connecting the center tap of the rectifier to the positive terminal of battery 48 and conductor 49 connecting the negative terminal of the battery to the center tap of secondary winding 42 of transformer 40.

Relay 45 includes a movable contact 50 normally biased to open position, as by a spring 51. The actuating winding of the relay includes two oppositely wound portions 52 and 53.

Connected separately, windings 52 and 53 each have a net electromagnetic effect on the movable contact of the relay. Windings 52 and 53 have the same number of turns. Thus, so long as the two windings are connected in series, there is no net magnetomotive force to operate the relay.

The transistor control circuit indicated generally at 54 in FIG. 2 is precisely the same as the control circuit illustrated in FIG. 1, like reference characters indicating identical components, except that relay windings 52 and 53 replace the control coils 11 and 12, respectively. Thus, transistor 22 is connected to shunt relay winding 52 and, so long as this transistor is nonconductive, windings 52 and 53 will be connected in series across the battery 48. However, when transistor 22 is conductive, relay winding 52 is effectively short-circuited, so that winding 53 will provide magnetomotive force to actuate the relay. With the battery voltage below the predetermined value to which the control circuit is to respond, transistor 22 is conductive, as was described in detail with reference to FIG. 1, and winding 52 is hence short-circuited, so that winding 53 is effective to maintain relay 45 closed, allowing charging current to flow through the battery. However, when the battery voltage reaches the predetermined value, transistor 22 is made nonconductive, in the manner hereinbefore explained, so that windings 52 and 53 are now effectively connected in series opposition and there is no substantial net magnetomotive force to operate the relay. Hence, the relay is returned to its normally open position, terminating the flow of charging current.

It is to be understood that, when manual switch 37 is closed, the control circuit is connected to the battery to receive current therefrom. At this instant, condenser 35 is in fully discharged condition and, therefore charges, so that, regardless of the battery voltage, the Zener diode 24 is initially subjected to substantially no voltage. Hence, transistor 23 will be nonconductive and transistor 22 conductive, so that winding 52 will be effectively short circuited and relay 45 closed to allow the flow of charging current. If the battery voltage is substantially below the predetermined cutoff value, the operation of the circuit will be as hereinbefore explained. If, however, it should happen that the battery voltage is initially above the predetermined cutoff value, the control circuit 54 will operate to make transistor 22 nonconductive as soon as condenser 35 has become charged, so that the end result is to promptly open relay 45 and terminate charging, since charging is not required. It is thus apparent that the condenser 35 provides a means assuring that transistor 22 will be initially conductive, regardless of the magnitude of the battery voltage, so that charging can be initiated when required. Condenser 35 serves this function in all embodiments of the invention disclosed herein.

Figure 2A:
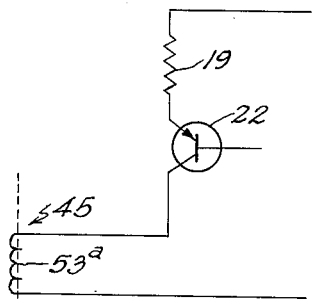
FIG. 2A is a fragmentary schematic diagram illustrating a modification of the device of FIG. 2.

The embodiment described with respect to FIG. 2 allows the use of transistors having relatively low maximum voltage rating in a charger adapted to charge batteries with voltages substantially exceeding the transistor ratings. When the predetermined battery voltage to which the cutoff circuit is to respond is less than the maximum voltage which can be safely applied to the transistors, the circuit can be simplified in the manner illustrated in FIG. 2A. Here, relay 45 has only a single winding 53a, this winding being connected in series with the collector of transistor 22. The operation of this modified embodiment of the invention will be readily understood by the explanation hereinbefore given with respect to FIG. 1A.

Figure 3:
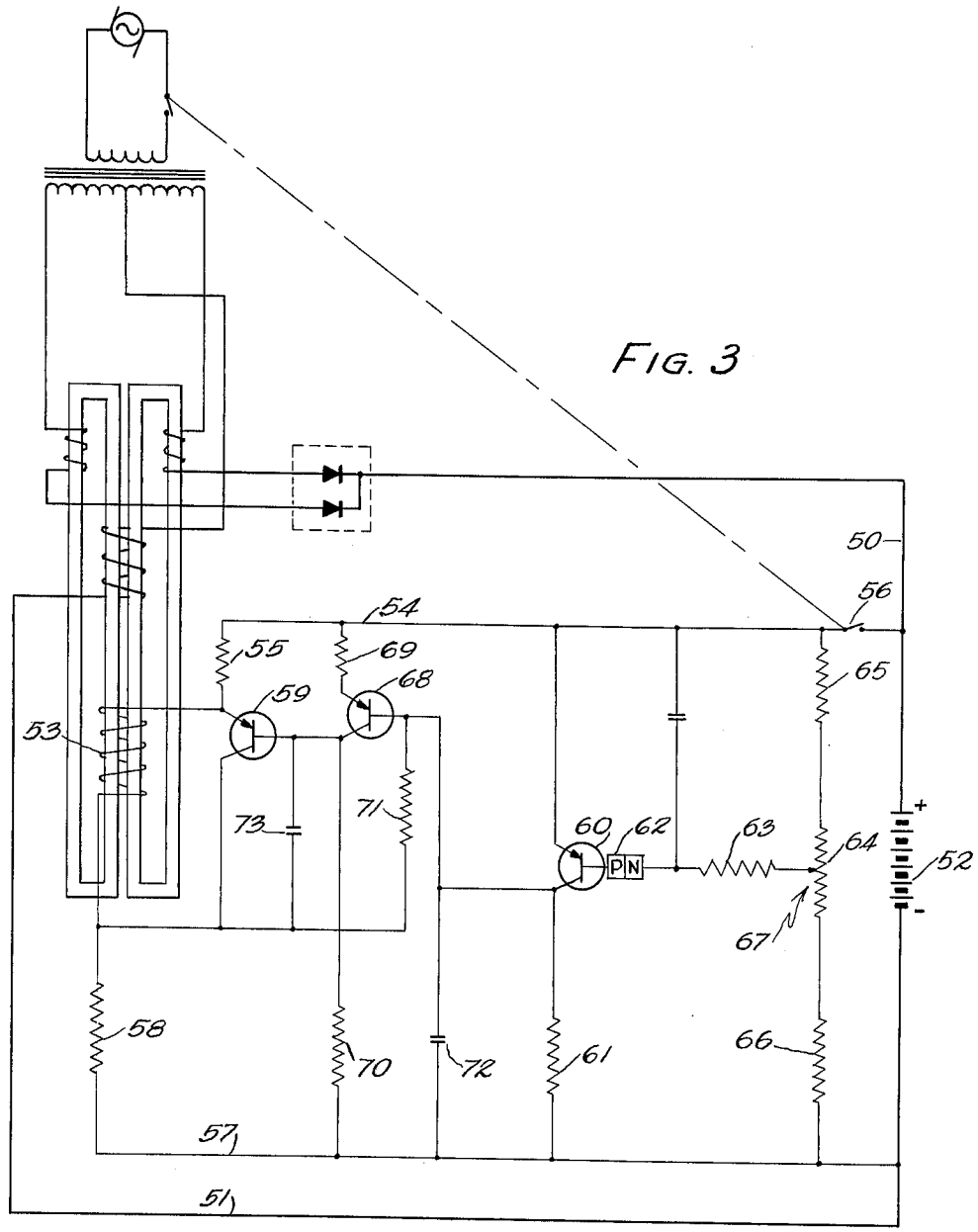
FIG. 3 is a circuit diagram illustrating another embodiment of the invention.

Turning now to FIG. 3, this embodiment of the invention involves a charging circuit comprising conductors 50, 51 connectable to the terminals of battery 52. The charging circuit can, for example, be constructed in the manner hereinbefore described with reference to FIG. 1, so as to be controllable by a saturable reactor including a control winding 53. One terminal of winding 53 is connected to the positive terminal of the battery by conductor 54, in which is connected a resistance 55 and switch 56. The other terminal of winding 53 is connected to the negative terminal of the battery by conductor 57, a resistor 58 being connected in conductor 57 in series with winding 53.

A first PNP type transistor 59 has its emitter connected to conductor 54 between winding 53 and resistance 55, and its collector connected to conductor 57 between winding 53 and resistor 58. Hence, the emitter-collector circuit of transistor 59 is in parallel with winding 53 and in series with resistor 58.

A second PNP type transistor 60 has its emitter connected directly to conductor 54 between resistance 55 and switch 56, and its collector connected to conductor 57, between resistor 58 and the battery, via resistance 61. The base of transistor 60 is connected, via Zener diode 62 and resistance 63, to the adjustable contact of a potentiometer 64. The latter combines with resistances 65 and 66, connected in series between conductors 54 and 57, to form a voltage divider 67 of which the adjustable contact of potentiometer 64 is the output terminal.

A third PNP type transistor 68 has its emitter connected to conductor 54, at a point between resistance 55 and the connection for transistor 60, via a resistance 69. The collector of transistor 68 is connected via a resistance 70 to conductor 57 at a point between resistance 58 and the connection for transistor 60. The base of transistor 68 is connected directly to the collector of transistor 60 and thus, through resistance 61, to conductor 57. The base of transistor 59 is connected directly to the collector of transistor 68 and thus, through resistance 70, to conductor 57.

A feedback resistance 71 is connected between the base of transistor 68 and the collector of transistor 59. Thus, resistor 58 can be considered as connected in series with resistance 71 to the base of transistor 68.

The base of transistor 68 is also connected to negative conductor 57 via a capacitor 72. A second capacitor 73 is connected between the base and collector of transistor 59.

Considering this circuit to be employed in the same general fashion hereinbefore described with reference to FIG. 1, it will be understood that winding 53 is poled as was winding 12, FIG. 1, and, when energized, provides a magnetomotive effect sufficient to control the saturable reactor to provide a maximum charging current. As will be described, transistor 59 is held nonconductive for values of battery terminal voltage below that selected as the cutoff point, and is made conductive when the battery voltage reaches such point. When transistor 59 conducts, winding 53 is shunted from the circuit, so that the control magnetomotive force provided thereby to the saturable reactor falls to zero, and the charging current level is automatically cut back as described with reference to FIG. 1. With winding 53 short-circuited, resistor 58 prevents the current from becoming excessive in the circuit of FIG. 3.

As compared to the circuit of FIG. 1, the circuit of FIG. 3 includes an additional stage of transistor amplification so that transistor 59 is made nonconductive under those conditions at which transistor 22, FIG. 1, conducts. Voltage divider 67 and Zener diode 62 operate to apply the reference voltage to transistor 60 in the manner described with reference to FIG. 1. When the reference voltage is below the cutoff point, transistors 60 and 59 are nonconductive and transistor 68 is conductive. When the reference voltage increases to the cutoff point, transistor 60 becomes conductive. The resulting additional current through resistances 61, 71 and 58 raises the potential at the base of transistor 68 to a point above that at the emitter, rendering transistor 68 nonconductive. Nonconduction of transistor 68 reduces the current in resistance 70, rendering transistor 59 conductive and so causing winding 53 to be short-circuited.

Resistor 71 is now connected to a much higher potential point than when transistor 59 was nonconductive. Current reversal through resistance 71 accordingly occurs, increasing the potential at the base of transistor 68 permanently above that of the emitter, assuring that transistor 68 remains nonconductive and transistor 59 fully conductive. Hence, the circuit is locked in voltage cutoff condition.

Capacitor 72 serves as a means for assuring that, when charging has been terminated, transistor 68 can be rendered conductive to initiate charging again. When the supply voltage is interrupted by opening switch 56, capacitor 72 discharges. When switch 56 is again closed, therefore, the potential at the base of transistor 68 will be lower than the emitter potential, and this transistor is accordingly conductive at the outset.

Capacitor 73, connected between the collector and the base of transistor 59 serves to suppress harmonic currents, tending to occur in winding 53, in the same manner described with reference to FIG. 1A.

In the embodiment of FIG. 1, the two windings 11 and 12 can be considered as forming a voltage divider connected in such fashion that operating voltages on the transistors are kept low. In the embodiment of FIG. 3, the winding 53 and resistor 58 also form a voltage divider making it possible to have low operating voltages on the transistors.

While, for purposes of simplifying the disclosure, the harmonic current suppressing capacitor (39a, FIG. 1A, and 73, FIG. 3) has been shown only in embodiments employing a single control winding, it will be apparent that such condenser can be employed equally well in the two-winding arrangement of FIG. 1, for example. It should also be noted that such capacitor can be used advantageously in the embodiments of FIGS. 2 and 2A where, though no problem of suppressing harmonics arises, the capacitor is effective to absorb induced voltages tending to occur when the control current is terminated.

While the invention has been described with reference to PNP type transistors, it is to be understood that NPN transistors can be employed, if desired, the usual circuit modifications well known to those skilled in the art then being made.

What is claimed is:

1. A control circuit for accomplishing an on-off control function in response to variation of a reference voltage, the combination of a first circuit to be connected across a source of varying voltage; a voltage divider connected across said first circuit and having an output terminal; first and second transistors each including an emitter, a base and a collector, the emitter and collector of both of said transistors being connected across said first circuit, the base of said first transistor being connected to the collector of said second transistor; a semiconductor diode, the base of said second transistor being connected to said voltage divider output terminal via said diode, and feedback circuit means connecting the collector of said first transistor to a point on said voltage divider spaced electrically from said output terminal.

2. A control circuit in accordance with claim 1 further including a capacitor connected across a portion of said voltage divider to insure that said second transistor is initially in a desired conductive state.

3. A control circuit for a battery charging unit connectable to provide two distinct levels of charging current to a battery, comprising an electromagnetic control means connected in the charging unit to control the charging level thereof, said control means including a pair of differential control windings so arranged that when both windings are energized one charging level results and when one winding is energized the other charging level results; means operatively connected to normally energize both windings; a voltage divider having an output terminal and connectable to the battery for normally providing a potential related to the battery terminal voltage; first and second transistors being so interconnected that the conductive state of said second transistor controls the conductive state of said first transistor, said first transistor being so connected to one of said windings to effectively disable the same when in the fully conductive state; a voltage selective diode having a precise breakdown voltage; and second transistor being connected to said output terminal via said diode, the conductive state of said second transistor being affected when said proportional potential exceeds said breakdown potential; and feedback means connected between said first transistor and a point on said voltage divider electrically spaced from said output terminal for providing a potential in said voltage divider corresponding to the conductive state of said first transistor.

4. A control circuit for accomplishing an on-off control function in response to variation of a reference voltage comprising a source of electrical current;
a load having two terminals, the voltage between said terminals constituting the varying reference voltage;
a voltage divider connectable between said two terminals and having an output terminal electrically spaced from said two terminals;
first and second transistors being so interconnected that said second transistor controls the conductive state of said first transistor;
control means responsive to the conductive state of said first transistor to control current flow between said source and said load;
a voltage selective semiconductor device having a critical potential at which conduction begins,
said second transistor being so connected to said output terminal via seaid semiconductor device that the conductive state of said second transistor is controlled by current flow through said semiconductor; and
direct current feedback circuit means connected between said first transistor and a point on said voltage divider spaced electrically from said output terminal and from said two terminals;
said feedback circuit means being operative to provide slowly varying direct current to said first transistor to (1) prevent a state of marginal conductivity from persisting in either transistor and (2) to render said transistors less likely to change conductive state after said critical potential has been exceeded.

5. A control circuit for battery charging apparatus connectable to provide charging current to a battery comprising
a voltage divider having an output terminal electrically spaced from the ends thereof,
said voltage divider being connectable at its ends across the battery to normally provide a potential proportional to the battery terminal voltage at said output terminal;
a connecting circuit including a voltage responsive semiconductor having a precise potential at which conduction begins;
a first and a second transistor so interconnected that said second transistor controls the operative state of said first transistor,
the base electrode of said second transistor being connected to said output terminal via said connecting circuit so that the conductive state of said transistor is altered when said precise potential is exceeded;
control means connected in the charging circuit to control charger operation in on-off fashion,
said first transistor being connected to operate said control means; and
positive direct current feedback circuit means connected between said first transistor and said voltage divider to provide slowly varying direct current to said first transistor to modify the potential provided at said output terminal to prevent a state of marginal conductivity from persisting in either one of said transistors and to render the control circuit non-responsive to small decreases in battery terminal voltage once said precise potential has been exceeded.

References Cited by the Examiner

UNITED STATES PATENTS 2,832,900 4/1958 Ford _____ 307—93
2,945,174 7/1960 Hetzler _____ 323—22
2,978,633 4/1961 Medlar.

LLOYD McCOLLUM, *Primary Examiner.*